US010158740B2

(12) United States Patent
Liang et al.

(10) Patent No.: US 10,158,740 B2
(45) Date of Patent: Dec. 18, 2018

(54) METHOD AND APPARATUS FOR WEBPAGE RESOURCE ACQUISITION

(71) Applicant: GUANGZHOU UCWEB COMPUTER TECHNOLOGY CO., LTD, Guangzhou (CN)

(72) Inventors: Jie Liang, Guangzhou (CN); Ruixiang Liu, Guangzhou (CN)

(73) Assignee: GUANGZHOU UCWEB COMPUTER TECHNOLOGY CO., LTD, Guangzhou (CN)

(*) Notice: Subject to any disclaimer, the term of this patent is extended or adjusted under 35 U.S.C. 154(b) by 175 days.

(21) Appl. No.: 15/176,803

(22) Filed: Jun. 8, 2016

(65) Prior Publication Data

US 2016/0373545 A1 Dec. 22, 2016

(30) Foreign Application Priority Data

Jun. 16, 2015 (CN) .......................... 2015 1 0334446

(51) Int. Cl.
*H04L 29/08* (2006.01)
*G06F 17/30* (2006.01)

(52) U.S. Cl.
CPC .... *H04L 67/2847* (2013.01); *G06F 17/30902* (2013.01); *H04L 67/02* (2013.01)

(58) Field of Classification Search
CPC ................. H04L 67/2847; H04L 67/02; G06F 17/30902

USPC ......................................... 709/213
See application file for complete search history.

(56) References Cited

U.S. PATENT DOCUMENTS

| | | | | |
|---|---|---|---|---|
| 2002/0032839 A1* | 3/2002 | Yamamoto | ........ | G06F 17/30902 711/118 |
| 2005/0086435 A1* | 4/2005 | Todoroki | ............ | G06F 12/0862 711/128 |
| 2013/0110906 A1* | 5/2013 | Zearing | ............. | G06F 17/30902 709/203 |
| 2014/0282163 A1* | 9/2014 | MacKinlay | ............ | G06Q 10/10 715/769 |
| 2014/0310470 A1* | 10/2014 | Rash | ................... | G06F 12/0862 711/126 |
| 2014/0324954 A1* | 10/2014 | Xu | .................... | G06F 17/30905 709/203 |

\* cited by examiner

*Primary Examiner* — Joseph L Greene
(74) *Attorney, Agent, or Firm* — Anova Law Group, PLLC (57) ABSTRACT

In accordance with various embodiments of the disclosed subject matter, a webpage resource acquisition method, and an apparatus thereof are provided. In some embodiments, the method comprises: obtaining pre-read webpage resources from a web server through a communication network according to a pre-read algorithm; storing raw data of the pre-read webpage resources in a pre-read cache; and in response to receiving a loading instruction to load a target webpage resource, obtaining the raw data of one pre-read webpage resource that corresponds to the target webpage resource from the pre-read cache based on the loading instruction without going through the communication network.

19 Claims, 5 Drawing Sheets

METHOD AND APPARATUS FOR WEBPAGE RESOURCE ACQUISITION

CROSS-REFERENCES TO RELATED APPLICATIONS

This application claims the priority of Chinese Patent Application No. 201510334446.2 filed on Jun. 16, 2015, the entire content of which is incorporated herein by reference.

FIELD OF THE DISCLOSURE

The present disclosure generally relates to the field of Internet technology and, more particularly, relates to a method and an apparatus for webpage resource acquisition.

BACKGROUND

When a user is browsing a website using a browser, an opening speed of webpages is significantly limited by the network environment. Most of the consumed time for looking for webpage resources spends on data transmission through the network. Webpage pre-reading technology is one of the solutions that can efficiently solve the problem. An existing webpage pre-reading process has the following steps. When a user uses a browser to browning a current webpage, one or more target webpages that are potentially to be accessed by the user can be determined, and the data of the one or more target webpage resources can be pre-read. After that, the one or more target webpages can be pre-layout and pre-rendered. If the user subsequently accesses one of the pre-read webpage, the corresponding pre-rendered and pre-layout webpage can be presented directly.

However, the existing pre-reading process performs many operations to the pre-read webpages, such as pre-analysis, pre-layout, pre-rendering, etc. These operations can consume a lot of system resources, resulting in inevitable influences to the performance of the user terminal system.

The disclosed method and apparatus for webpage resource acquisition are directed to solve one or more problems set forth above and other problems.

BRIEF SUMMARY OF THE DISCLOSURE

In accordance with some embodiments of the disclosed subject matter, a method and an apparatus for webpage resource acquisition are provided.

An aspect of the present disclosure provides a method for webpage resource acquisition. The method includes obtaining pre-read webpage resources from a web server through a communication network according to a pre-read algorithm; storing raw data of the pre-read webpage resources in a pre-read cache; and in response to receiving a loading instruction to load a target webpage resource, obtaining the raw data of one pre-read webpage resource that corresponds to the target webpage resource from the pre-read cache based on the loading instruction without going through the communication network.

Another aspect of the present disclosure provides an apparatus for webpage resource acquisition. The apparatus includes a webpage resources pre-read unit configured for obtaining pre-read webpage resources from a web server through a communication network according to a pre-read algorithm; a pre-read cache unit configured for storing raw data of the pre-read webpage resources in a pre-read cache; a pre-read webpage resources storing unit configured for performing a storing operation to store the obtained raw data of the pre-read webpage resources in the pre-read cache unit; and a target webpage resource acquiring unit configured for receiving a loading instruction to load a target webpage resource, and obtaining the raw data of one pre-read webpage resource that corresponds to the target webpage resource from the pre-read cache based on the loading instruction without going through the communication network.

Another aspect of the present disclosure provides a non-transitory computer readable memory comprising a computer readable program stored thereon, wherein, when being executed, the computer readable program causes a computer to implement a method for webpage resource acquisition, the method comprising: obtaining pre-read webpage resources through a communication network according to a pre-read algorithm; storing raw data of the pre-read webpage resources in a pre-read cache; and in response to a loading instruction to load a target webpage resource, obtaining the raw data of one pre-read webpage resource that corresponds to the target webpage resource from the pre-read cache based on the loading instruction without going through the communication network.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In accordance with various embodiments, the disclosed subject matter provides a webpage resource acquisition method, and an apparatus thereof. The disclosed method can directly store the raw data of the pre-read webpage resources in a local pre-read cache, instead of processing the raw data of the pre-read webpage resources. When a webpage is confirmed to be loaded, the corresponding raw data of the webpage resources can be obtained from the local pre-read cache, and then be used to generate the webpage. Thus, the disclosed method can reduce the occupation of the system resources, and can also increase an amount of pre-read webpages.

Figure 1:
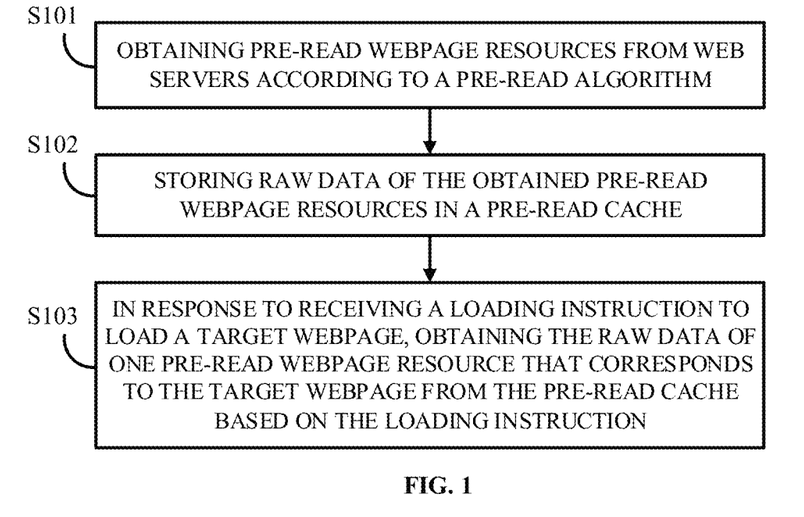
FIG. 1 illustrates a flowchart of an exemplary process for webpage resource acquisition in accordance with some embodiments of the disclosed subject matter.

FIG. 1 illustrates a flowchart of an exemplary process for webpage resource acquisition in accordance with some embodiments of the disclosed subject matter. As illustrated, the method can include the following steps.

Step S101: obtaining pre-read webpage resources from web servers according to a pre-read algorithm.

When a user is using a browser to browse a current webpage, the browser can predict one or more webpages that are potentially to be accessed by the user, and can search in advance the related webpage resources of the one or more webpages, and then can download the pre-read webpage resources of one or more webpages from web servers.

The pre-read algorithm may include any appropriate mechanism to predict or determine which webpages most likely to be accessed by the user from the current webpage. For example, the browser may predict one or more webpages to be accessed by the user based on browsing history of the user from the current webpage or from browsing history of other users from the current webpage.

Step S102: storing raw data of the obtained pre-read webpage resources in a pre-read cache.

After obtaining pre-read webpage resources from web servers, the raw data of the obtained pre-read webpage resources can be stored directly in a pre-read cache without performing any processing. So the system resources on the user terminal are not required to be called in this step.

Step S103: in response to receiving a loading instruction to load a target webpage, obtaining raw data of one pre-read webpage resource that corresponds to the target webpage from the pre-read cache based on the loading instruction.

The pre-read raw data are used for presenting one or more predicted webpages that are potentially to be accessed by the user. When the user makes a webpage browsing instruction, the browser can send a loading instruction to load the target webpage. The loading instruction includes corresponding information relating to the target webpage that is to be accessed by the user. In response to receiving the loading instruction, the raw data corresponding to the target webpage resource can be searched from the pre-read cache.

That is, when the cache capacity is limited, the disclosed method can store the pre-read webpage resources in a form of raw data without any further processing. Since the raw data only occupies a relatively small space, so the cache can store more webpage resources that correspond to more links. Besides, the pre-read webpage resources are only stored without being processed, resulting in substantially less system resource consuming.

By using the disclosed method for webpage resource acquisition, when pre-reading one or more webpages, the obtained raw data of the pre-read webpage resources can be directly stored in a local cache without performing any parsing operation. When one of the pre-read webpages is required to be loaded, the raw data of the one webpage resource corresponding to the one pre-read webpage can be directly read from the local cache without initiating a request through the network. The method can avoid performing analysis, decompression, decryption, pre-layout, pre-rendering, and other operations to the raw data right after downloading the raw data of the pre-read webpage resources. Therefore, the system resources consumed can be greatly reduced, and the limitation of the existing webpage pre-reading method that only a small number of pre-read webpages can be stored due to the occupation of a large amount of system resources can be efficiently solved.

Figure 2:
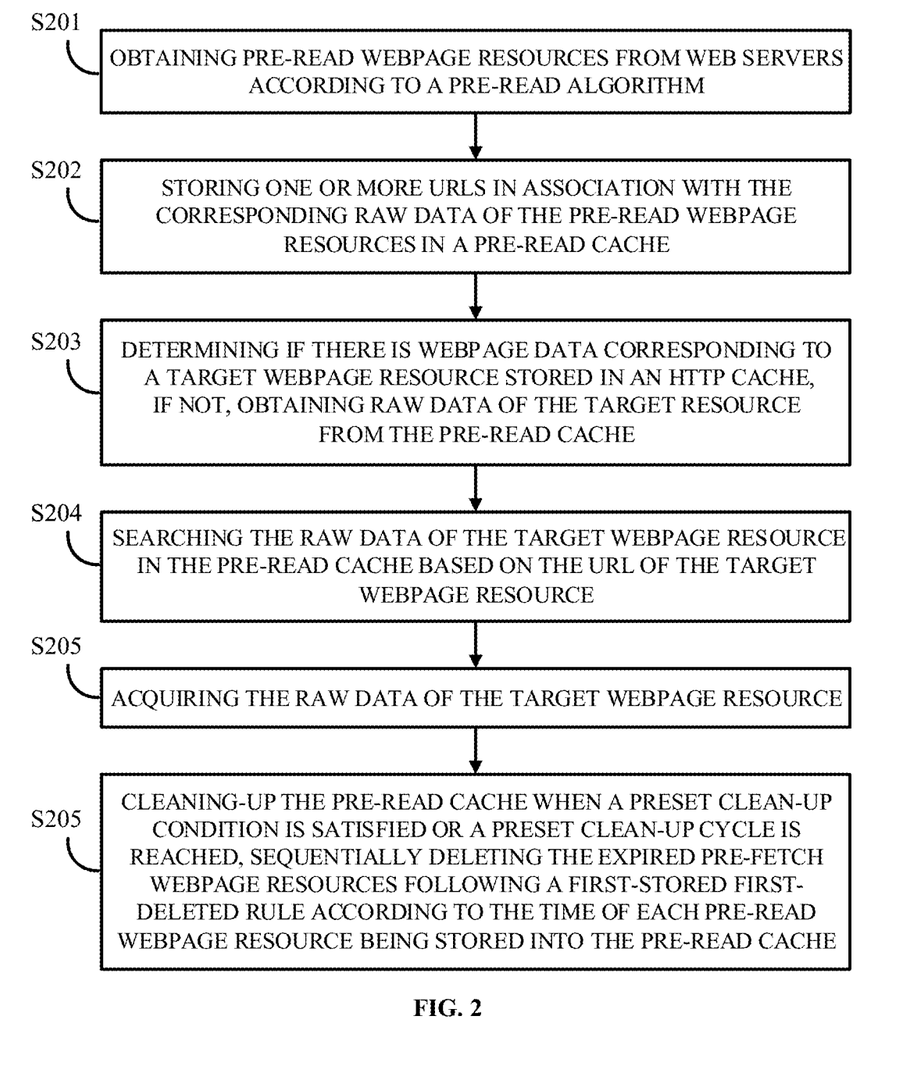
FIG. 2 illustrates a flowchart of another exemplary process for webpage resource acquisition in accordance with some embodiments of the disclosed subject matter.

FIG. 2 illustrates a flowchart of another exemplary method for webpage resource acquisition in accordance with some embodiments of the disclosed subject matter. As illustrated, the method can include the following steps.

Step S201: obtaining pre-read webpage resources from web servers according to a pre-read algorithm.

According to the predicting results from the browser kernel, webpage resources of one or more webpages that are potentially to be accessed by the user can be obtained from web servers.

Step S202: storing one or more Uniform Resource identifiers (URLs) in association with the corresponding raw data of the pre-read webpage resources in a pre-read cache.

For a convenient searching purpose, the pre-read webpage resources can be stored in the pre-read cache as a key-value form. The one or more Uniform Resource Identifiers (URLs) of the pre-read webpage resources can be used as keys, while the corresponding raw data of the pre-read webpage resources can be used as values. Some other information related to the pre-read webpage resources, such as effective time lengths of the one or more pre-read webpages, can also be stored together in the pre-read cache.

Step S203: determining if there is webpage data corresponding to a target webpage resource stored in an HTTP cache. If not, obtaining raw data of the target webpage resource from the pre-read cache.

The webpage resources acquisition apparatus further includes an HTTP cache for storing webpage data of the webpages that have already been accessed. When the browser generates a loading instruction to load a target webpage resource, the HTTP cache can be checked as a priority. If webpage data corresponding to the target webpage resource is found in the HTTP cache, the webpage data can be called directly. If no webpage data corresponding to the target webpage resource is found in the HTTP cache, the subsequent steps can be performed.

That is, after the browser determines that the target webpage needs to be loaded for the user by, for example, a click from the user or other loading instructions, the browser further determines whether the target webpage data is already in the HTTP cache, because it may be fastest way to load the target webpage from the browser history or the HTTP cache, before searching the pre-read raw data in the local cache.

Step S204: searching the raw data of the target webpage resource in the pre-read cache based on the URL of the target webpage resource.

If no webpage data corresponding to the target webpage resource is found in the HTTP cache, the pre-read cache can then be checked to search the raw data of the target webpage resource. The received loading instruction includes the URL of the target webpage resource, while the pre-read webpage resources are stored in the pre-read cache in a form that the URLs are used as the keys and the raw data is used as the values. Therefore, the raw data corresponding to the URL of the target webpage resource can be retrieved in the pre-read cache.

Step S205: acquiring the raw data of the target webpage resource.

After the searching process, the retrieved raw data of the target webpage resource can be read from the pre-read cache.

Step S206: cleaning-up the pre-read cache when a preset clean-up condition is satisfied, or it is within a preset clean-up cycle, deleting expired pre-read webpage resources sequentially following a first-stored first-deleted rule according to the time of each webpage resource being stored into the pre-read cache.

In practice, the space of the pre-read cache is limited. The stored webpage resources are need to be cleaned-up timely in order to ensure that the subsequent pre-read webpage resources can be stored. Besides, webpage resources usually have effective time periods. After a certain period of time, a webpage resource can be expired, and can become valueless when stored in the pre-read cache. For example, a pre-read webpage resource stored in the pre-read cache has an effective time period of 20 minutes. When the pre-read webpage resource has been stored in the pre-read cache for 20 minutes, the pre-read webpage resource can be considered as an expired pre-read webpage resource.

According to the time of each webpage resource being stored into the pre-read cache and the effective time period of each webpage resource, each webpage resource stored in the pre-read cache can be determined as an expired pre-read webpage resource or not. Then, based on the configuration of the system, the expired pre-read webpage resources can be deleted.

A clean-up condition can be preset. For example, an occupancy rate of the pre-read cache has reached a certain value, or a size of the stored pre-read webpage resources has exceeded a certain value. As another example, the clean-up process can be performed according to a clean-up cycle, such as once a day, once a week, and so on. During the clean-up process, the expired pre-read webpage resources can be sequentially deleted according to a first-in first-out (FIFO) rule. That is, a pre-read webpage resources firstly stored should be firstly deleted.

In the following, a specific implementation example of the disclosed method is described in details. When a user is browsing the Internet through a browser, one or more webpage resources that are potentially to be acquired by the user can be predicted by analyzing the user behavior and using a pre-read algorithm.

A webpage resource acquisition apparatus can sequentially obtain the raw data of the webpage resources and save the raw data to a pre-read cache. In some embodiments, when obtaining the pre-read webpage resources, a URL can be used for pointing the location of each webpage resource. That is, each webpage resource corresponding to a link has a unique URL.

When the user clicks one link, the browser can generate a loading instruction to load the webpage resource corresponding to the one link. The loading instruction indicates to load the URL of the target webpage resource corresponding to the one link. If the user has previously accessed the webpage corresponding to the one link, the webpage data of the accessed webpage can be directly be retrieved from the HTTP cache and can be called directly. If not, a searching process can be performed to search the pre-read cache. It can be determined whether the webpage resource corresponding to the one link has been stored in the pre-read cache or not. For example, the URL of the target webpage resource in the loading instruction can be compared with the stored URLs of the pre-read webpage resources in the pre-read cache. If a same URL can be retrieved, it indicates that the target webpage resource has been pre-read, then the raw data of the target webpage resource can be obtained directly from the pre-read cache. If a same URL cannot be retrieved, the browser can initiate a webpage request going through the Internet.

After obtaining the pre-read webpage resource, the raw data of the pre-read webpage resource can be processed in any suitable way, such as decompression, decryption, page analysis, page layout, page rendering, and other operations, to obtain the target webpage.

After a certain period of time, a clean-up process is performed to clean up the pre-read cache. The expired pre-read webpage resources can be deleted following a FIFO rule. The clean-up process can be performed according to a preset time period, or can be activated by a preset condition.

Accordingly, the disclosed webpage resource acquisition method can pre-read one or more webpages, and can directly store the obtained raw data of the pre-read webpage resources in a local cache without performing any parsing operation. When one of the pre-read webpages is required to be loaded, the raw data corresponding to the one pre-read webpage resource can be directly read from the local cache without initiating a request through the network. The method can avoid performing analysis, decompression, decryption, pre-layout, pre-rendering, and other operations to the raw data right after downloading the raw data of the pre-read webpage resources during pre-reading. Therefore, the system resources consumed can be greatly reduced, and the limitation of the existing webpage pre-reading method that only a small number of pre-read webpages can be stored due to the occupation of a large amount of system resources can be efficiently solved.

Figure 3:
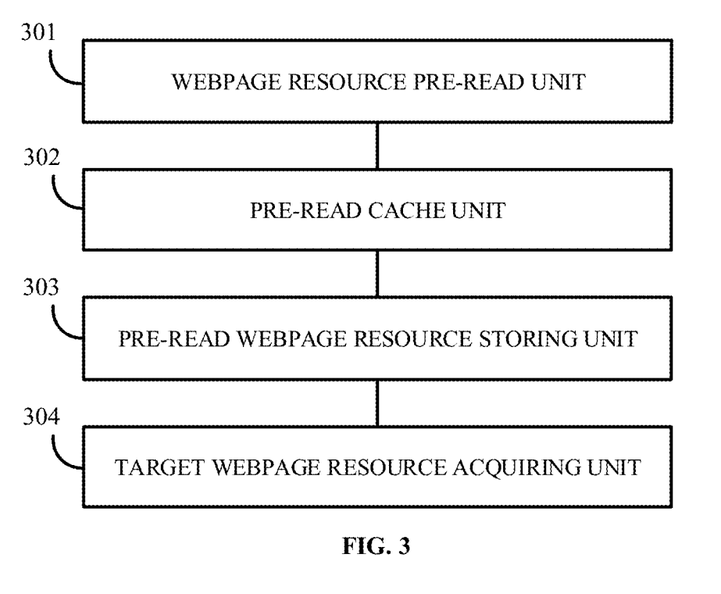
FIG. 3 illustrates a schematic structural diagram of an exemplary apparatus for webpage resource acquisition in accordance with some embodiments of the disclosed subject matter.

Referring to FIG. 3, a schematic structural diagrams of an exemplary apparatus for webpage resource acquisition is shown in accordance with some embodiments of the disclosed subject matter. As illustrated, the apparatus can include a webpage resource pre-read unit 301, a pre-read cache unit 302, a pre-read webpage resource storing unit 303, and a target webpage resource acquiring unit 304. Other units may also be included.

Webpage resource pre-read unit 301 is configured for obtaining pre-read webpage resources from web servers according to a pre-read algorithm.

Pre-read cache unit 302 is configured for storing the raw data of the obtained pre-read webpage resources.

Pre-read webpage resource storing unit 303 is configured for performing a storing operation to store the raw data of the obtained pre-read webpage resources into a pre-read cache.

Target webpage resource acquiring unit 304 is configured for receiving a loading instruction to load a target webpage, and obtaining the raw data of the pre-read webpage resources that corresponds to the target webpage from the pre-read cache based on the loading instruction.

The disclosed apparatus for webpage resource acquisition can consist of a pre-read engine and a browser kernel in a specific implementation. In some embodiments, the pre-read engine and the browser kernel are independent with each other but can work together. In some other embodiments, the pre-read engine having a pre-reading function and the browser kernel can be integrated together to form a webpage resource acquisition apparatus.

When a user is using a browser to browsing a current webpage, the webpage resources pre-read unit 301 can predict one or more webpages that are potentially to be accessed by the user, and can obtain the pre-read webpage resources from web servers. The obtained pre-read webpage resources can be stored in a pre-read cache.

The raw data of the obtained pre-read webpage resources is received by the webpage resource acquisition apparatus and can be processed by the browser kernel to generate a webpage to be presented to the user.

The pre-read webpage resources storing unit 303 can directly store the received raw data of the pre-read webpage resources in a pre-read cache without performing any operation. So the system resources of user terminal are not required to be called. It also should be noted that the size of the raw data from the network stream is much less than the size of the corresponding webpage that is generated by operating the raw data.

When the user performs an operation to open the target webpage, the browser can send a loading instruction for loading the target webpage to the webpage resource acquisition apparatus. The target webpage resource acquiring unit 304 can search the pre-read cache in response to receiving the loading instruction. If the target webpage resource corresponding to the loading instruction can be retrieved in the pre-read cache, it indicates that the raw data of the corresponding pre-read webpage resource has been stored in the pre-read cache. Then the raw data of the pre-read webpage resource can be obtained directly from the pre-read cache. Since the raw data stored in the pre-read cache is a local resource, the browser does not have to initiate a request through the network. After obtaining the raw data of the target webpage resource, according to the conventional operations of the raw data, the raw data of the target webpage resource can be processed to generate the target webpage required by the user.

When the cache capacity is limited, the disclosed webpage resource acquisition apparatus can store the pre-read webpage resources in a form of the raw data without any further processing. Since the raw data only occupies a relatively small space, so the webpage resource acquisition apparatus can store more webpage resources corresponding to more links. Besides, the pre-read webpage resources are only stored without being processed, resulting in substantially less system resource consuming.

The disclosed webpage resource acquisition apparatus can pre-read one or more webpages, and can directly cache the obtained raw data of the pre-read webpage resources without performing any parsing operation. When one of the pre-read webpage is required to be loaded, the raw data corresponding to the one pre-read webpage resource can be directly read from the local cache without initiating a request through the network. It can avoid performing analysis, decompression, decryption, pre-layout, pre-rendering, and other operations to the raw data right after downloading the raw data of the pre-read webpage resources. Therefore, the system resources consumed can be greatly reduced, and the limitation of the existing webpage pre-reading method that only a small number of pre-read webpages can be stored due to the occupation of a large amount of system resources can be efficiently solved.

Figure 4:
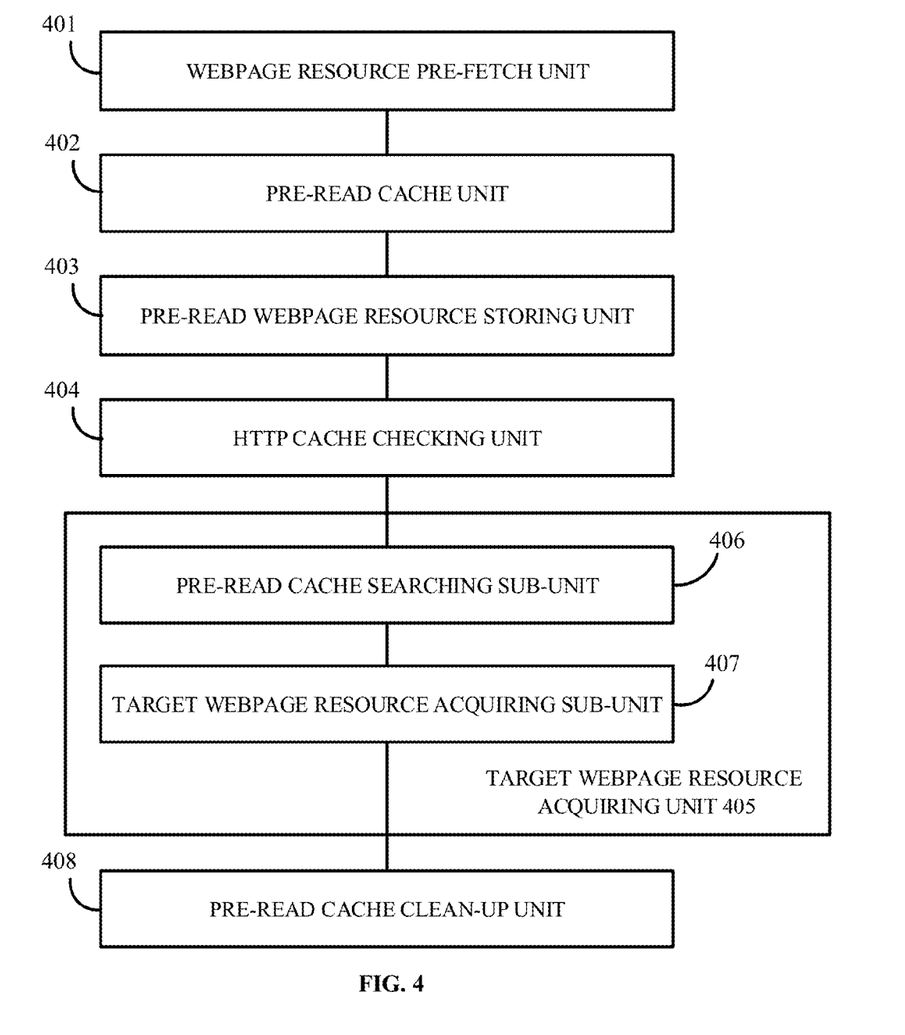
FIG. 4 illustrates a schematic structural diagram of another exemplary apparatus for webpage resource acquisition in accordance with some embodiments of the disclosed subject matter.

Referring to FIG. 4, a schematic structural diagrams of another exemplary apparatus for webpage resource acquisition is shown in accordance with some embodiments of the disclosed subject matter. As illustrated, the apparatus can include the following units.

Webpage resources pre-read unit 401 is configured for obtaining pre-read webpage resources from web servers according to a pre-read algorithm.

Pre-read cache unit 402 is configured for storing the raw data of the obtained pre-read webpage resources.

Pre-read webpage resources storing unit 403 is configured for performing a storing operation to store the raw data of the obtained pre-read webpage resources into a pre-read cache.

HTTP cache checking unit 404 is configured for checking if there is webpage data corresponding to the resource of one target webpage stored in an HTTP cache before the target webpage resource acquiring unit 405 to obtain the raw data of the pre-read webpage resources that corresponds to the target webpage from the pre-read cache.

Target webpage resource acquiring unit 405 is configured for receiving a loading instruction to load a target webpage, and obtaining the raw data of one pre-read webpage resource that corresponds to the target webpage from the pre-read cache based on the loading instruction.

The target webpage resource acquiring unit 405 can include pre-read cache searching sub-unit 406 and target webpage resource acquiring sub-unit 407.

The pre-read cache searching sub-unit 406 is configured for searching the raw data of the one target webpage resource corresponding to the target webpage in the pre-read cache based on the URL of the target webpage resource.

The target webpage resource acquiring sub-unit 407 is configured for acquiring the raw data of the target webpage resource retrieved by the pre-read cache searching sub-unit 406.

Pre-read cache clean-up unit 408 is configured for cleaning-up the pre-read cache. When a preset clean-up condition is satisfied, or it is within a preset clean-up cycle, according to the time of each webpage resource being stored into the pre-read cache, the expired pre-read webpage resources can be sequentially deleted following a first-stored first-deleted rule.

When a user is using a browser to browsing a current webpage, the webpage resources pre-read unit 401 can predict one or more webpages that are potentially to be accessed by the user, and can obtain the pre-read webpage resources from web servers according to a pre-read algorithm. The pre-read webpage resources storing unit 403 can store the URLs of the pre-read webpage resources and the corresponding raw data of the pre-read webpage resources in the pre-read cache unit 402.

When the user performs an operation to open the target webpage, the browser can send a loading instruction for loading the target webpage to the webpage resource acquisition apparatus. The loading instruction indicates to load the URL of the target webpage.

The HTTP cache checking unit 404 can firstly check if there is webpage data corresponding to the resource of one target webpage stored in the HTTP cache. If the user has previously accessed the webpage corresponding to the one link, the webpage data of the accessed webpage has already stored in the HTTP cache. If there is no corresponding webpage data of the accessed webpage stored in the HTTP cache, the target webpage resource acquiring unit 405 can acquire the raw data of one pre-read webpage resource corresponding to the target webpage resource from the pre-read cache according to the loading instruction for loading the URL of the target webpage.

Acquiring the raw data of pre-read webpage resource can include two sub-steps that operated by the two sub-units of the target webpage resource acquiring unit 405. The pre-read cache searching sub-unit 406 can search the raw data of the target webpage resource in the pre-read cache based on the URL of the target webpage resource. The target webpage resource acquiring sub-unit 407 can acquire the raw data of the target webpage resource retrieved by the pre-read cache searching sub-unit 406.

The capacity of the pre-read cache unit 402 is limited. After a certain period of time, pre-read cache clean-up unit 408 can perform a clean-up process to clean up the pre-read cache. The expired pre-read webpage resources can be deleted following a FIFO rule. The clean-up process can be performed according to a preset time period, or can be activated by a preset condition.

Accordingly, the disclosed webpage resource acquisition apparatus has a same principle and same technical effects compared to the embodiment described above in connection with FIG. 3. Some portions of the apparatus illustrated in FIG. 4 that are not mentioned can be referred cases to the detailed implementation aforementioned in connection with FIG. 3.

Figure 6:
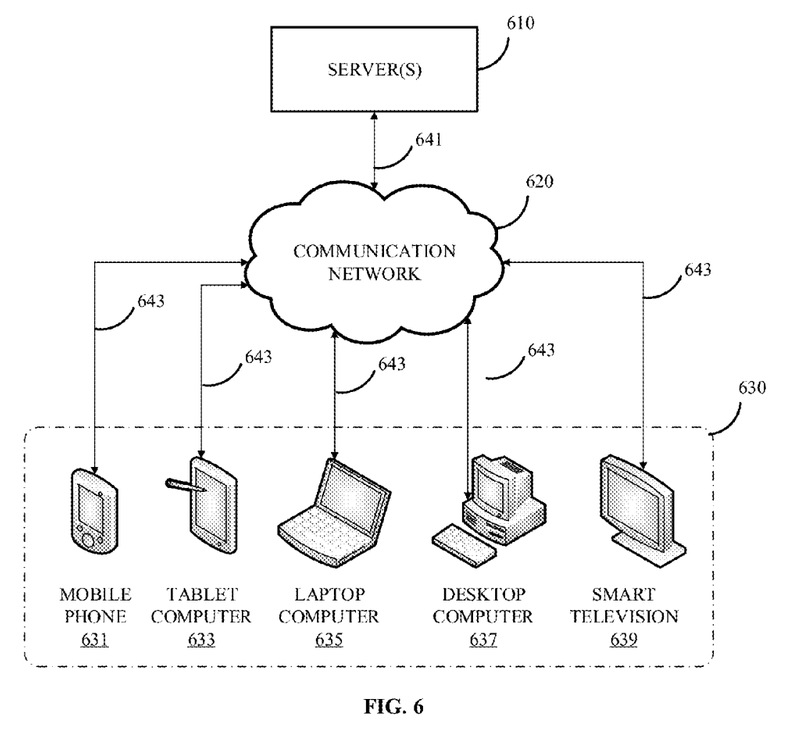
FIG. 6 illustrates a schematic structural diagram of an exemplary system incorporating certain aspects of the disclosed embodiments.

Referring to FIG. 6, an exemplary system for webpage resource acquisition in accordance with some embodiments of the disclosed subject matter is shown. As illustrated, the system can include one or more servers 610, a communication network 620, one or more user device 630, and/or any other suitable component. User devices 630 can be connected by one or more communication links 643 to communications network 620 that can be linked via a communication link 641 to a server 610.

In some embodiments, one or more steps of, or all of, the method for webpage resource acquisition described above in connection with FIGS. 1-2, can be implemented by one or more suitable hardware processors of server(s) 610, user device(s) 630, and/or other suitable component of the system.

Server(s) 610 and/or user device(s) 630 can include any suitable units described above in connection with FIGS. 3 and 4.

In some embodiments, communication network 620 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

User device(s) 630 can include any suitable device that can communicate with one or more severs though communication network 620, receive user request, process and transmit data, and/or present webpages, and/or perform any other suitable function. For example, a user device 630 can be a mobile phone 631, a tablet computer 633, a laptop computer 635, a desktop computer 637, a set-top box, a television 639, a streaming media player, a game console, and/or any other suitable device.

Although five user devices 631, 633, 635, 637, and 639 are shown in FIG. 6 to avoid over-complicating the drawing, any suitable number of these devices, and any suitable types of these devices, can be used in some embodiments.

The disclosed webpage resource acquisition apparatus can be one or more server(s) 610 and/or user device(s) 630, and can be implemented using any suitable hardware in some embodiments. For example, as illustrated in an exemplary hardware 600 of FIG. 5, such hardware can include a hardware processor 504, memory and/or storage 501, bus 502, and communication interface(s) 503.

Figure 5:
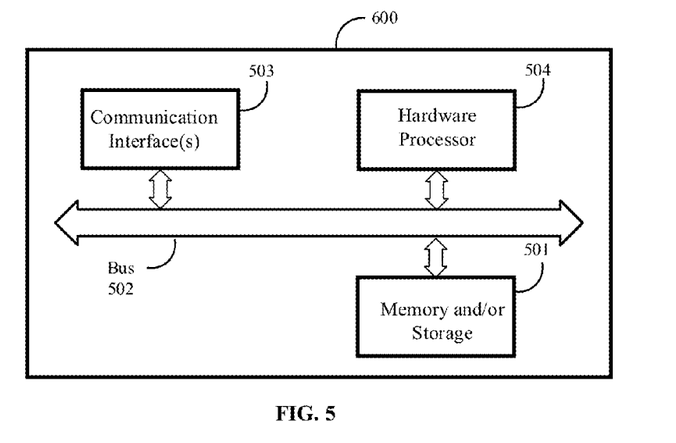
FIG. 5 illustrates a schematic hardware diagram of an exemplary apparatus for webpage resource acquisition in accordance with some other embodiments of the disclosed subject matter.

Memory and/or storage 501 can be any suitable memory and/or storage for storing programs, data, media content, webpage URLs, raw data of webpage resources, information of users and/or any other suitable content in some embodiments. For example, memory and/or storage 704 can include random access memory (RAM), read only memory, flash memory, non-volatile memory, such as hard disk storage, optical media, and/or any other suitable storage device.

Communication interface(s) 503 can be any suitable circuitry for interfacing with one or more communication networks, such as communication network 620 in some embodiments. For example, interface(s) 714 can include network interface card circuitry, wireless communication circuitry, and/or any other suitable circuitry for interfacing with one or more communication networks, such as Internet, wide area network, local network, metropolitan area networks, etc.

Bus 502 can be any suitable mechanism for communicating between two or more of components of the webpage resource acquisition apparatus. Bus 502 may be an ISA bus, a PCI bus, an EISA bus, or any other suitable bus. The bus 502 can be divided into an address bus, a data bus, a control bus, etc. The bus 502 is represented as a two-way arrow in FIG. 5, but it does not mean that it is only one type bus or only one bus.

Memory and/or storage 501 can be used for storing program. The hardware processor 504 can operate the program in response to receiving an operating instruction. In some embodiments, one or more steps of, or all of, the method for webpage resource acquisition described above in connection with FIGS. 1-2, can be implemented by hardware processors 504.

Hardware processor 504 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or other programmable logic device, discrete gate or transistor logic device, discrete hardware components. The hardware processor 504 can implement or execute various embodiments of the disclosed subject matter including one or more method, steps and logic diagrams. A general purpose processor may be a microprocessor or any other conventional processors. The steps of the disclosed method in various embodiments can be directly executed by a hardware decoding processor, or by a decoding processor combined by a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory and/or storage 501. Hardware processor 504 can implement the steps of the disclosed method by combining the hardware and the information read from the memory and/or storage 501.

In addition, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions. It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in. It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

The disclosed subject matter provides a computer program product for performing a webpage resource acquisition method on a webpage resource acquisition apparatus. The computer program product includes computer-readable storage medium storing program codes. The program code includes instructions for performing the disclosed method. The specific implementations of the disclosed method can be referred to the various embodiments described above in connection with FIGS. 1 and 2.

Those skilled in the art can clearly understand that, for convenience and simplicity of description, the specific working process of the systems, devices and units described above can be referred to the corresponding processes of various embodiments of the disclosed method described above.

In various embodiments provided herein, it should be understood that, the disclosed system, apparatus and method can be realized through other ways. The disclosed embodiments of the apparatus are merely illustrative. For example, the division of units is merely a division of logical functions which may be divided by another way in the actual implementation. As another example, multiple units or components can be combined or be integrated into another system. Some features can be ignored, or not be executed. At another point, the illustrated or discussed mutual coupling, direct coupling, or communicating connection can be coupled or connected through electrical, mechanical, or other type of communication interfaces.

A unit described as a separate member may be or may not be physically separated. A component illustrated as a unit may be or may not be a physical unit. A unit can be located in one place, or be distributed to multiple network elements. According to actual needs, a part of or all of the units can be selected to realize the purpose of disclosed subject matter.

Further, various functional units in the various embodiments of the disclosed subject matter can be integrated in a processing unit, or can be separate physical units. Two or more functional units can also be integrated in one unit.

If the functions are implemented as software functional units, and being used or sold as a standalone product, the product can be stored in a computer readable storage medium. Based on this understanding, an essential part of the technical nature of the disclosed subject matter, or a part of the technical nature of the disclosed subject matter that can contribute to prior arts, or any part of the technical nature of the disclosed subject matter, can be embodied in a form of a computer software product. The computer software product can be stored in a storage medium, including multiple instructions to instruct a computer device (may be a personal computer, a server, or a network equipment) to perform all or part of the steps of the disclosed method according to various embodiments. The aforementioned storage media can include: U disk, removable hard disk, read only memory (ROM), random access memory (RAM), floppy disk, CD-ROM, or any other suitable medium that can store program codes.

It should be noted that, as used herein, relational terms such as "first," "second," and the like are used solely to a separate one operation/entity and another operation/entity, and do not necessarily require or imply that these entities or operations have actual relationship or order. Moreover, the term "comprising," "including," or any other variation thereof are intended to cover a non-exclusive inclusion, such that a process, a method, an article, or an apparatus, including a series of elements, does not only include those elements, but also include other non-explicitly listed elements, or further include some inherent elements of such process, method, article or apparatus. Without further constraints, an element defined by the clause "include a" does not exclude another same element in such process, method, article or apparatus.

In the description of the disclosed subject matter, it should also be noted that, without additional clear definition and limitation, the term "set," "mount," "link," "connect," and the like should be broadly interpreted. For example, two connected elements may be fixedly connected, or be removably connected, or be integrally connected; may be mechanically connected, or be electrically connected; may be directly connected, or be connected indirectly through intermediaries, or be connected interiorly in the two elements. Those of ordinary skill in the art, can interpret the meanings of the above terms in specific circumstances of the disclosed subject matter.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure. It should be noted that, similar reference numerals and letters are refer to similar items in the figures, and thus once an item is defined in one figure, it can be no further defined and explained in the subsequent figures.

What is claimed is:

1. A method for webpage resource acquisition, comprising:
    obtaining, by a browser kernel, pre-read webpage resources through a communication network by:
        in response to a current webpage being browsed by a user, predicting, by the browser kernel, one or more webpages that are potentially to be accessed by the user,
        searching in advance, by the browser kernel, webpage resources related to the one or more webpages, and
        downloading, by the browser kernel, the webpage resources related to the one or more webpages from web servers as the pre-read webpage resources;

when pre-reading the one or more webpages, storing, by the browser kernel, raw data of the pre-read webpage resources in a pre-read cache; and in response to a loading instruction to load a target webpage resource, obtaining the raw data of one pre-read webpage resource that corresponds to the target webpage resource from the pre-read cache based on the loading instruction without going through the communication network.

2. The method of claim 1, further comprising:

determining if there is webpage data corresponding to the target webpage resource stored in an HTTP cache; and when it is determined that there is no webpage data corresponding to the target webpage resource stored in the HTTP cache, obtaining the raw data of one pre-read webpage resource that corresponds to the target webpage resource from the pre-read cache.

3. The method of claim 1, wherein storing raw data of the pre-read webpage resources in the pre-read cache further comprises:

storing a plurality of Uniform Resource Identifiers (URLs) of the pre-read webpage resources in association with corresponding raw data of the pre-read webpage resources in the pre-read cache.

4. The method of claim 3, wherein:

the loading instruction indicates to load a URL of the target webpage resource.

5. The method of claim 3, wherein:

the pre-read webpage resources are stored in the pre-read cache as a key-value form;

the plurality of URLs of the pre-read webpage resources are used as keys; and the corresponding raw data of the pre-read webpage resources are used as values.

6. The method of claim 3, wherein obtaining the raw data of the pre-read webpage resources that corresponds to the target webpage resource from the pre-read cache based on the loading instruction comprises:

searching the raw data of the target webpage resource in the pre-read cache based on the URL of the target webpage resource; and obtaining the raw data of the target webpage resource based the searching.

7. The method of claim 1, further comprising:

when a preset clean-up condition is satisfied, or a preset clean-up cycle is reached, according to a time of each pre-read webpage resource being stored into the pre-read cache, sequentially deleting expired pre-read webpage resources following a first-stored first-deleted rule.

8. An apparatus for webpage resource acquisition, comprising:

a browser kernel, configured for:

obtaining pre-read webpage resources through a communication network by;

in response to a current webpage being browsed by a user, predicting one or more webpages that are potentially to be accessed by the user, searching in advance webpage resources related to the one or more webpages, and downloading the webpage resources related to the one or more webpages from web servers as the pre-read webpage resources;

storing, when pre-reading the one or more webpages, raw data of the pre-read webpage resources in a pre-read cache;

a pre-read webpage resources storing unit configured for performing a storing operation to store the obtained raw data of the pre-read webpage resources in the pre-read cache unit; and a target webpage resource acquiring unit configured for receiving a loading instruction to load a target webpage resource, and obtaining the raw data of one pre-read webpage resource that corresponds to the target webpage resource from the pre-read cache based on the loading instruction without going through the communication network.

9. The apparatus of claim 8, wherein the browser kernel is further configured for:

checking if there is webpage data corresponding to the target webpage resource stored in an HTTP cache before target webpage resource acquiring unit obtaining the raw data of one pre-read webpage resource that corresponds to the target webpage resource from the pre-read cache.

10. The apparatus of claim 8, wherein the browser kernel is further configured for:

searching the raw data of the target webpage resource in the pre-read cache based on a URL of the target webpage resource.

11. The apparatus of claim 10, wherein the browser kernel is further configured for:

obtaining the raw data of the target webpage resource found by the pre-read cache searching sub-unit.

12. The apparatus of claim 8, wherein the browser kernel is further configured for:

cleaning-up the pre-read cache when a preset clean-up condition is satisfied, or a preset clean-up cycle is reached; and sequentially deleting expired pre-read webpage resources following a first-stored first-deleted rule according to a time of each pre-read webpage resource being stored into the pre-read cache.

13. A non-transitory computer readable memory comprising a computer readable program stored thereon, wherein, when being executed, the computer readable program causes a computer to implement a method for webpage resource acquisition, the method comprising:

obtaining, by a browser kernel, pre-read webpage resources through a communication network by:

in response to a current webpage being browsed by a user, predicting one or more webpages that are potentially to be accessed by the user, searching in advance webpage resources related to the one or more webpages, and downloading the webpage resources related to the one or more webpages from web servers as the pre-read webpage resources;

storing, when pre-reading the one or more webpages, raw data of the pre-read webpage resources in a pre-read cache; and in response to a loading instruction to load a target webpage resource, obtaining the raw data of one pre-read webpage resource that corresponds to the target webpage resource from the pre-read cache based on the loading instruction without going through the communication network.

14. The non-transitory computer readable memory of claim 13, wherein the method further comprising:

determining if there is webpage data corresponding to the target webpage resource stored in an HTTP cache; and when it is determined that there is no webpage data corresponding to the target webpage resource stored in the HTTP cache, obtaining the raw data of one pre-read webpage resource that corresponds to the target webpage resource from the pre-read cache.

15. The non-transitory computer readable memory of claim 13, wherein storing raw data of the pre-read webpage resources in the pre-read cache further comprises:
- storing a plurality of Uniform Resource Identifiers (URLs) of the pre-read webpage resources in association with corresponding raw data of the pre-read webpage resources in the pre-read cache.

16. The non-transitory computer readable memory of claim 15, wherein:
- the loading instruction indicates to load a URL of the target webpage resource.

17. The non-transitory computer readable memory of claim 15, wherein:
- the pre-read webpage resources are stored in the pre-read cache as a key-value form;
- the plurality of URLs of the pre-read webpage resources are used as keys; and
  - the corresponding raw data of the pre-read webpage resources are used as values.

18. The non-transitory computer readable memory of claim 15, wherein obtaining the raw data of the pre-read webpage resources that corresponds to the target webpage resource from the pre-read cache based on the loading instruction comprises:
- searching the raw data of the target webpage resource in the pre-read cache based on the URL of the target webpage resource; and
- obtaining the raw data of the target webpage resource based on the searching.

19. The non-transitory computer readable memory of claim 13, wherein the method further comprising:
- when a preset clean-up condition is satisfied, or a preset clean-up cycle is reached, according to a time of each pre-read webpage resource being stored into the pre-read cache, sequentially deleting expired pre-read webpage resources following a first-stored first-deleted rule.

\* \* \* \* \*